(12) United States Patent
Zhang et al.

(10) Patent No.: US 9,236,014 B2
(45) Date of Patent: Jan. 12, 2016

(54) LED BACKLIGHT DRIVING CIRCUIT, LCD DEVICE, AND METHOD FOR DRIVING THE LED BACKLIGHT DRIVING CIRCUIT

(71) Applicant: SHENZHEN CHINA STAR OPTOELECTRONICS TECHNOLOGY CO., LTD, Shenzhen (CN)

(72) Inventors: Xianming Zhang, Shenzhen (CN); Xiang Yang, Shenzhen (CN)

( * ) Notice: Subject to any disclaimer, the term of this patent is extended or adjusted under 35 U.S.C. 154(b) by 111 days.

(21) Appl. No.: 13/981,587

(22) PCT Filed: Jun. 28, 2013

(86) PCT No.: PCT/CN2013/078305
§ 371 (c)(1),
(2) Date: Jul. 24, 2013

(87) PCT Pub. No.: WO2014/180056
PCT Pub. Date: Nov. 13, 2014

(65) Prior Publication Data
US 2014/0333518 A1 Nov. 13, 2014

(30) Foreign Application Priority Data
May 8, 2013 (CN) .......................... 2013 1 0167075

(51) Int. Cl.
*G09G 3/36* (2006.01)
*H05B 33/08* (2006.01)
(Continued)

(52) U.S. Cl.
CPC ................ *G09G 3/36* (2013.01); *G09G 3/3406* (2013.01); *H05B 33/0809* (2013.01); *H05B 33/0815* (2013.01); *H05B 33/0824* (2013.01); *H05B 33/0851* (2013.01); *G09G 3/003* (2013.01)

(58) Field of Classification Search
None
See application file for complete search history.

(56) References Cited

U.S. PATENT DOCUMENTS 8,810,153 B2 * 8/2014 Yoshio ............... H05B 33/0815
                                                                    315/185 R
8,994,639 B2 * 3/2015 Gao ..................... G09G 3/3406
                                                                    345/102

(Continued)

FOREIGN PATENT DOCUMENTS

CN          101207329 A       6/2008
CN          102170727 A       8/2011

(Continued)

OTHER PUBLICATIONS

Yang Xue, the International Searching Authority written comments, Feb. 2014, CN.

*Primary Examiner* — Dismery Mercedes

(57) ABSTRACT

A light emitting diode (LED) backlight driving circuit includes a power module, a constant current driving module, and an LED light bar coupled to the power module. A light-bar-voltage collecting module is coupled to an output end of the LED light bar and outputs a first comparison voltage. A power-voltage collecting module is coupled to an output end of the power module and outputs a second comparison voltage. The constant current driving module includes a switching unit and a control unit. The control unit adjusts an output voltage of the power module. A preset reference voltage is sent to the switching unit. When an absolute value of a difference between a preset reference voltage and the first comparison voltage exceeds a preset range of a voltage, the switching unit outputs the first comparison voltage to the control unit.

19 Claims, 3 Drawing Sheets

(51) Int. Cl.
*G09G 3/34* (2006.01)
*G09G 3/00* (2006.01)

(56) References Cited

U.S. PATENT DOCUMENTS

| | | | |
|---|---|---|---|
| 9,001,098 B2* | 4/2015 | Seo | G09G 3/32 315/169.1 |
| 2005/0007085 A1* | 1/2005 | Murakami | 323/282 |
| 2010/0194307 A1* | 8/2010 | Nonaka et al. | 315/294 |
| 2011/0037396 A1* | 2/2011 | Chien | H05B 33/0818 315/185 R |
| 2011/0102475 A1 | 5/2011 | Agarwal et al. | |
| 2011/0157246 A1* | 6/2011 | Jang | G09G 3/3406 345/690 |
| 2011/0267375 A1* | 11/2011 | Yang | G09G 3/3406 345/690 |
| 2012/0062148 A1* | 3/2012 | Kim | H05B 33/0815 315/297 |
| 2012/0153848 A1* | 6/2012 | Shin | G09G 3/3406 315/192 |
| 2013/0026933 A1* | 1/2013 | Gao | 315/192 |
| 2013/0285571 A1* | 10/2013 | Li | H05B 33/0827 315/297 |
| 2014/0009455 A1* | 1/2014 | Li | G09G 3/3406 345/212 |
| 2014/0055439 A1* | 2/2014 | Lee et al. | 345/212 |
| 2014/0139419 A1* | 5/2014 | Zhang et al. | 345/102 |
| 2014/0176014 A1* | 6/2014 | Hu | G09G 3/3426 315/307 |
| 2014/0253842 A1* | 9/2014 | Zhang | H05B 33/0815 349/62 |

FOREIGN PATENT DOCUMENTS

| | | |
|---|---|---|
| CN | 202307083 U | 7/2012 |
| CN | 102637412 A | 8/2012 |
| CN | 102708801 A | 10/2012 |
| CN | 202514139 U | 10/2012 |
| CN | 103295536 A | 9/2013 |
| EP | 2458939 A1 | 5/2012 |
| KR | 20120077574 A | 7/2012 |

\* cited by examiner

LED BACKLIGHT DRIVING CIRCUIT, LCD DEVICE, AND METHOD FOR DRIVING THE LED BACKLIGHT DRIVING CIRCUIT

TECHNICAL FIELD

The present disclosure relates to the field of a display device, and more particularly to a light emitting diode (LED) backlight driving circuit, a liquid crystal display (LCD) device, and a method for driving the LED backlight driving circuit.

BACKGROUND

A liquid crystal display (LCD) device includes a backlight module including a light emitting diode (LED) backlight driving circuit. The LED backlight driving circuit includes a power module, a constant current driving module, and an LED light bar coupled to the power module. In a typical three-dimensional (3D) display control of the LED backlight driving circuit, feedback information is according to an output voltage of the LED, which may result in a current overshoot, thereby causing an abnormal output current and an output voltage with an overhigh ripple.

SUMMARY

In view of the above-described problems, the aim of the present disclosure is to provide a light emitting diode (LED) backlight driving circuit, a liquid crystal display (LCD) device, and a method for driving the LED backlight driving circuit capable of avoiding the LED backlight driving circuit from outputting an abnormal current and an output voltage with an overhigh ripple in a three-dimensional (3D) display thereof.

The aim of the present disclosure is achieved by the following method.

An LED backlight driving circuit comprises a power module, a constant current driving module, an LED light bar coupled to the power module, a power-voltage collecting module coupled to an output end of the power module, and a light-bar-voltage collecting module coupled to an output end of the LED light bar. The light-bar-voltage collecting module outputs a first comparison voltage, and the power-voltage collecting module outputs a second comparison voltage. The constant current driving module comprises a switching unit and a control unit coupled to the switching unit. The control unit adjusts an output voltage of the power module, the first comparison voltage and the second comparison voltage are sent to the switching unit, and a preset reference voltage is sent to the switching unit. When the first comparison voltage deviates from the reference voltage, and an absolute value of the reference voltage subtracted from the first comparison voltage exceeds a preset deviation range of a voltage, the switching unit outputs the first comparison voltage to the control unit. When the absolute value of the reference voltage subtracted from the first comparison voltage is within the preset deviation range of the voltage, the switching unit outputs the second comparison voltage to the control unit.

The preset deviation range of the voltage is a range of difference between the first comparison voltage and the reference voltage, and may be set by equipment type or program control. For example, when the absolute value of the reference voltage subtracted from the first comparison voltage is within the range of 1 V, 2 V, 3 V, or 5 V, namely, the preset deviation range of the voltage is 1 V, 2 V, 3 V, or 5 V. Thus the switching unit outputs the second comparison voltage to the control unit, when the absolute value of the reference voltage subtracted from the first comparison voltage exceeds the range of 1 V, 2 V, 3 V, or 5 V, the switching unit outputs the first comparison voltage to the control unit.

Furthermore, the switching unit comprises a first controllable switch, a second controllable switch, a comparing assembly, and a switching assembly coupled to the comparing assembly.

The first comparison voltage is sent to the control unit by the first controllable switch, the second comparison voltage is sent to the control unit by the second controllable switch, and logical operation of the first controllable switch is opposite to logical operation the second controllable switch.

A reference voltage with a high level is sent to a first end of the switching assembly, and a second end of the switching assembly is coupled to a ground terminal. A control end of the first controllable switch and a control end of the second controllable switch are coupled to the same end of the switching assembly. When the first comparison voltage deviates from the reference voltage, and the absolute value of the reference voltage subtracted from the first comparison voltage exceeds the preset deviation range of the voltage, the comparing assembly drives the switching assembly to turn on, and drives the first controllable to turn on and the second controllable to turn off. This is a specific circuit structure of the switching unit, which uses the first controllable switch and the second controllable switch to control the first comparison voltage and the second comparison voltage, where logical operation of the first controllable switch is opposite to logical operation of the second controllable switch. The circuit is simple and avoids simultaneous feedback of the first comparison voltage and the second comparison voltage, thereby improving circuit reliability.

Furthermore, the comparing assembly comprises a first comparator and a second comparator. The reference voltage is sent to a non-inverting input end of the first comparator and an inverting input end of the second comparator. And the first comparison voltage is sent to an inverting input end of the first comparator and a non-inverting input end of the second comparator. The switching assembly comprises a third controllable switch and a fourth controllable switch, the reference voltage with the high level is sent to first ends of the third controllable switch and the fourth controllable switch, and second ends of the third controllable switch and the fourth controllable switch is coupled to the ground terminal. The first comparator controls the third controllable to turn on or turn off, and the second comparator controls the fourth controllable to turn on or turn off. This is specific structures of the comparing assembly and the switching assembly, one of two comparators is used to determine whether the first comparison voltage is greater than the reference voltage or not, the other comparator is used to determine whether the first comparison voltage is lower than the reference voltage or not. As long as the first comparison voltage deviates from the reference voltage and a deviation value exceeds the preset deviation range of the voltage, the comparataor is driven to turn on the third controllable switch and the fourth controllable switch. Thus, voltages of the control ends of the first controllable switch and the second controllable switch can increase and reduce, which drives the first controllable switch to turn on and the second controllable switch to turn off, then the switching unit outputs the first comparison voltage to the control unit. Additionally, the controllable switch turns on, which requires a corresponding driving voltage, and the comparator may correspondingly amplify the driving voltage, so when the absolute value of the reference voltage subtracted from the first comparison voltage exceeds the present deviation range, the driving voltage can drive the third controllable switch or the fourth controllable switch to turn on after the driving voltage is amplified by the comparator. Thus, the ordinary technical personnel of the technical field of the present disclosure may adjust the deviation range of the voltage by selecting different type comparators or the controllable switches driven by different driving voltages.

Furthermore the switching unit further comprises a first resistor, the reference voltage with the high level is sent to the third controllable switch and the fourth controllable switch via the first resistor. Control ends of the first controllable switch and the second controllable switch are coupled to first ends of the third controllable switch and the fourth controllable switch. The first controllable switch turns on at a low level, and the second controllable switch turns on at the high level. This is a scheme of turning on the first controllable switch at the low level and outputting the first comparison voltage, where turning on any one of the third controllable switch and the fourth controllable switch may reduce the level of the control ends of the first controllable switch and the second controllable switch. The first resistor may limit currents flowing through the third controllable switch and the fourth controllable switch, which avoids the third controllable switch and the fourth controllable switch from damage because of a high current, thereby improving the circuit reliability.

Furthermore, the switching unit further comprises a sixth resistor, the third controllable switch and the fourth controllable switch are coupled to the ground terminal via the sixth resistor. Control ends of the first controllable switch and the second controllable switch are coupled to second ends of the third controllable switch and the fourth controllable switch, and the second ends of the third controllable switch and the fourth controllable switch are connected with the sixth resistor. The first controllable switch turns on at the high level, and the second controllable switch turns on at a low level. This is a scheme of turning on the first controllable swtich at the high level and outputting the first comparison voltage, where turning on any one of the third controllable switch and the fourth controllable switch may increase the level of the control ends of the first controllable switch and the second controllable switch. The sixth resistor may divide the voltage of the circuit, thus a high level signal is outputted to drive the first controllable switch and the second controllable switch to turn on. Additionally, the sixth resistor may also limit current flowing through the third controllable switch and the fourth controllable switch, which avoids the third controllable switch and the fourth controllable switch from damage because of a high current, thereby improving the circuit reliability.

The power-voltage collecting module comprises a second resistor, a third resistor, and a fourth resistor that are connected in series between the output end of the power module and the ground terminal. A voltage of the fourth resistor is regarded as the second comparison voltage and is sent to the switching unit. This is a circuit of the power-voltage collecting module using the resistor divider, which simplifies the circuit and reduces costs.

Furthermore, the light-bar-voltage collecting module comprises a fifth resistor, and the fifth resistor is connected in series between the output end of the LED light bar and the ground terminal. A voltage of the fifth resistor is regarded as the first comparison voltage and is sent to the switching unit. This is a circuit of the light-bar-voltage collecting module using the resistor divider, which simplifies the circuit and reduces costs.

Furthermore, the switching unit comprises a first controllable switch, a second controllable switch, a comparing assembly and a switching assembly coupled to the comparing assembly. The first comparison voltage is sent to the control unit by the first controllable switch, the second comparison voltage is sent to the control unit by the second controllable switch. The comparing assembly comprises a first comparator and a second comparator. The reference voltage is sent to a non-inverting input end of the first comparator and an inverting input end of the second comparator, and the first comparison voltage is sent to an inverting input end of the first comparator OP1 and a non-inverting input end of the second comparator. The switching assembly comprises a third controllable switch and a fourth controllable switch, the reference voltage with the high level is sent to first ends of the third controllable switch and the fourth controllable switch, and second ends of the third controllable switch and the fourth controllable switch is coupled to the ground terminal. The first comparator controls the third controllable to turn on/off, and the second comparator controls the fourth controllable to turn/off. The switching unit further comprises a first resistor, the reference voltage of the high level is sent to the third controllable switch and the fourth controllable switch via the first resistor. Control ends of the first controllable switch and the second controllable switch are coupled to first ends of the third controllable switch and the fourth controllable switch.

The first controllable switch turns on at a low level, and the second controllable switch turns on at the high level. The power-voltage collecting module comprises a second resistor, a third resistor, and a fourth resistor that are connected in series between the output end of the power module and the ground terminal. A voltage of the fourth resistor is regarded as the second comparison voltage and is sent to the switching unit. The light-bar-voltage collecting module comprises a fifth resistor, and the fifth resistor is connected in series between the output end of the LED light bar and the ground terminal. A voltage of the fifth resistor is regarded as the first comparison voltage and is sent to the switching unit. This is a specific LED backlight driving circuit, which uses the first controllable switch and the second controllable switch to control the first comparison voltage and the second comparison voltage, where logical operation of the first controllable switch is opposite to logical operation of the second controllable switch. The circuit is simple and avoids simultaneous feedback of the first comparison voltage and the second comparison voltage, thereby improving circuit reliability.

One of two comparators is used to determine whether the first comparison voltage is greater than the reference voltage or not, the other comparator is used to determine whether the first comparison voltage is lower than the reference voltage or not. As long as the first comparison voltage deviates from the reference voltage and the deviation value exceeds the preset deviation range of the voltage, the comparator is driven to turn on the third controllable switch and the fourth controllable switch. Thus, voltages of the control ends of the first controllable switch and the second controllable switch can increase or reduce, which drives the first controllable switch to turn on and the second controllable switch to turn off, then the switching unit outputs the first comparison voltage to the control unit. Additionally, the controllable switch turns on, which requires a corresponding driving voltage, and the comparator may correspondingly amplify the driving voltage, so when the absolute value of the reference voltage subtracted from the first comparison voltage exceeds the present deviation range, the driving voltage can drive the third controllable switch or the fourth controllable switch to turn on after the driving voltage is amplified by the comparator. Thus, the ordinary technical personnel of the technical field of the present disclosure may adjust the deviation range of the voltage by selecting different type comparators or the controllable switches driven by different driving voltages.

Levels of the control ends of the first controllable switch and the second controllable switch can be reduced by turning on any one of the third controllable switch and the fourth controllable switch, where the first controllable switch turns on and the second controllable switch turns off, then the switching unit outputs the first comparison voltage to the control unit. The first resistor may limit currents flowing through the third controllable switch and the fourth controllable switch, which avoids the third controllable switch and the fourth controllable switch from damage because of a high current, thereby improving reliability of the circuit.

The circuit of the power-voltage collecting module and the light-bar-voltage collecting module uses a resistor divider way, which simples the circuit and reduces product costs.

A liquid crystal display (LCD) device comprises the LED backlight driving circuit of the present disclosure.

A method for driving the LED backlight driving circuit comprising a power module and an LED light bar coupled to the power module, comprises:

A: presetting a reference voltage, receiving an output voltage of the LED light bar as a first comparison voltage, and receiving an output voltage of the power module as a second comparison voltage;

B: comparing the first comparison voltage with the reference voltage, when an absolute value of the reference voltage subtracted from the first comparison voltage deviates from a preset deviation range of a voltage, executing a step C; when the absolute value of the reference voltage subtracted from the first comparison voltage is within a preset deviation range of the voltage, executing a step D;

C: sending the first comparison voltage to the power module, and adjusting the output voltage of the power module, then returning the step B; and D: sending the second comparison voltage to the power module, and stabilizing the output voltage of the power module, then returning the step B.

In research, when the LCD device uses a three-dimensional (3D) display, a plurality of LED light bars connected to in parallel are driven one by one, if the difference between the output voltages of each of the LED light bars is large, which may result in a current overshooting, thereby causing an abnormal output current and an output voltage with overhigh ripple. In the present disclosure, the output voltages of all LED light bars (namely the first comparison V1) and the output voltage of the power module (namely the second comparison V2) are simultaneously sent to the switching unit. When the first comparison voltage greatly changes, the switching unit outputs the first comparison voltage to the control unit to make the power module to determine a level of the output voltage thereof. When the first comparison voltage is basically stable, a value of the first comparison voltage is close to a value of the reference voltage, the switching unit outputs the second comparison voltage to the control unit. The second comparison voltage reflects an entire output voltage of the power module, when the second comparison voltage is at a normal working state, the voltage value is stable, and so the second comparison voltage may be used to stabilize the output voltage of the power module. When the first comparison voltage greatly changes, the switching unit outputs the first comparison voltage to the control unit, and the control unit readjusts again the output voltage of the power module. Thus, an instability of the voltage caused by frequently switching the plurality of LED light bars does not affect the output voltage of the power module, thereby avoiding the 3D display driving circuit from outputting an abnormal current and a voltage with overhigh ripple.

DETAILED DESCRIPTION

Figure 1:
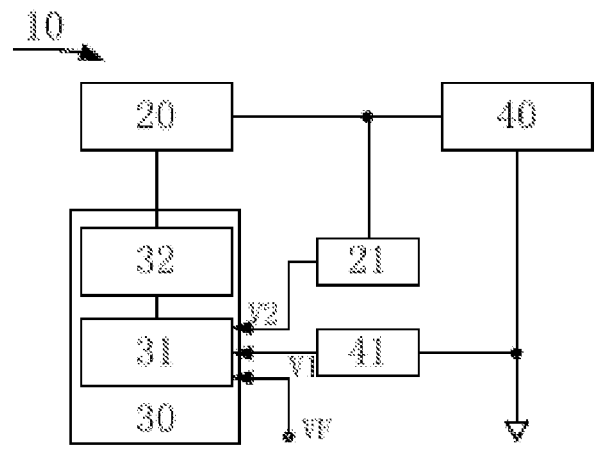
FIG. 1 is a block diagram of a light emitting diode (LED) backlight driving circuit of the present disclosure.

The present disclosure provides a liquid crystal display (LCD) device comprising a liquid crystal (LC) panel and a backlight module. The backlight module comprises a light emitting diode (LED) backlight driving circuit 10. As shown in FIG. 1, the LED backlight driving circuit 10 comprises a power module 20, a constant current driving module 30, and an LED light bar 40 coupled to the power module 20. The LED backlight driving circuit 10 further comprises a power-voltage collecting module 21 coupled to an output end of the power module 20, and light-bar-voltage collecting module 41 coupled to an output end of the LED light bar 40. The light-bar-voltage collecting module 41 outputs a first comparison voltage V1, and the power-voltage collecting module 21 outputs a second comparison voltage V2. The constant current driving module 30 comprises a switching unit 31 and a control unit 32 coupled with the switching unit 31. The control unit 32 adjusts an output voltage of the power module 20, the first comparison voltage V1 and the second comparison voltage V2 are sent to the switching unit 31, and a preset reference voltage VF is also sent to the switching 31. When the first comparison voltage V1 deviates from the preset reference VF and a deviation value exceeds a preset deviation range of the voltage, the switching unit 31 outputs the first comparison voltage V1 to the control unit 32; when the deviation value is within a preset deviation range of the voltage, the switching unit 31 outputs the second comparison voltage V2 to the control unit 32.

The preset deviation range of the voltage is a range of difference between the first comparison voltage V1 and the reference voltage VF, and may be set by equipment type or program control. For example, when an absolute value of the reference voltage VF subtracted from the first comparison voltage V1 is within the range of 1V, 2V, 3V, or 5V, namely, the preset deviation range of the voltage is 1V, 2V, 3V, or 5V. Thus, the switching unit outputs the second comparison voltage V2 to the control unit 32, when the absolute value of the reference voltage VF subtracted from the first comparison voltage V1 exceeds the range of 1V, 2V, 3V, or 5V, the switching unit outputs the first comparison voltage V1 to the control unit 32.

It should be understood that when the LCD device uses a three-dimensional (3D) display, a plurality of LED light bars connected in parallel are driven one by one. If the difference between the output voltage of each of the LED light bars is large, which may result in a current overshooting, thereby causing an abnormal output current and an output voltage with overhigh ripple. In the present disclosure, the output voltages of all LED light bars (namely the first comparison V1) and the output voltage of the power module (namely the second comparison V2) are simultaneously sent to the switching unit. When the first comparison voltage V1 greatly changes, the switching unit outputs the first comparison voltage V1 to the control unit to make the power module determine the output voltage. When the first comparison voltage V1 is stable, the first comparison voltage V1 is close to the reference voltage VF, the switching unit 31 outputs the second comparison voltage V2 to the control unit 32. The second comparison voltage V2 reflects an entire output voltage of the power module, when the second comparison voltage V2 is at a normal working state, the voltage value is stable, and so the second comparison voltage V2 may be used to stabilize the output voltage of the power module. When the first comparison voltage V1 greatly changes, the switching unit outputs the first comparison voltage V1 to the control unit, and the control unit readjusts the output voltage of the power module. Thus, an instability of the voltage caused by frequently switching the plurality of LED light bars does not affect the output voltage of the power module, thereby avoiding the three-dimensional (3D) display driving circuit from outputting an abnormal current and a voltage with overhigh ripple.

The present disclosure will further be described in detail in accordance with the figures and the exemplary examples.

EXAMPLE 1

Figure 2:
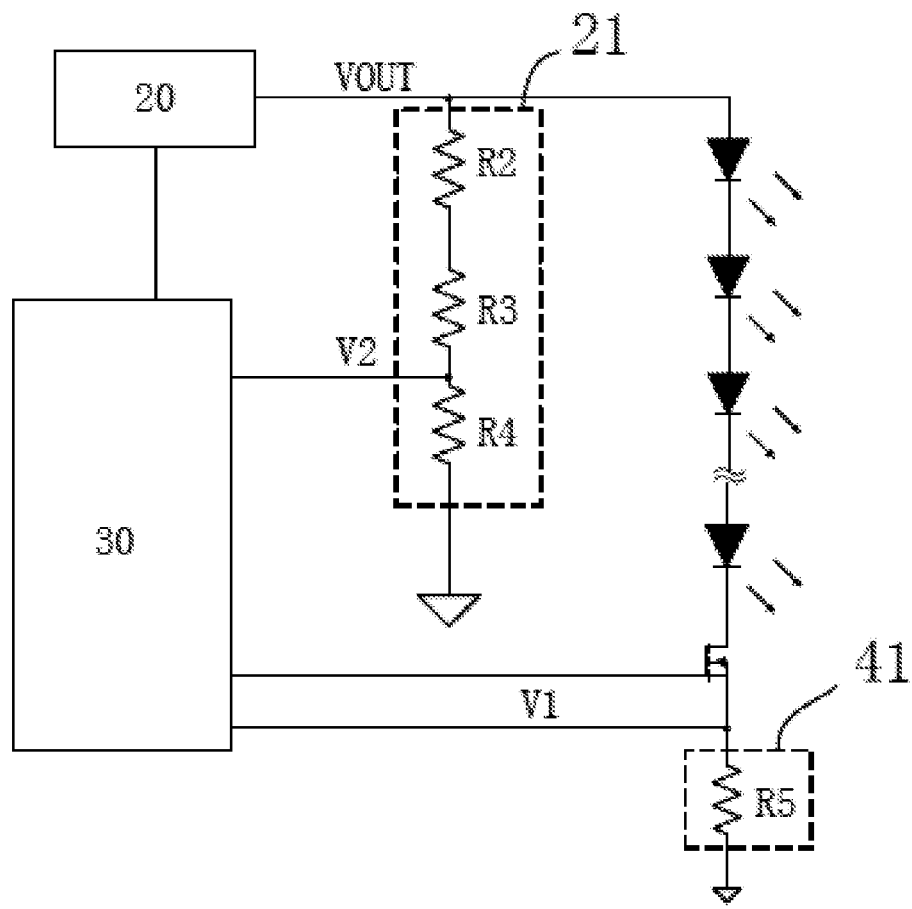
FIG. 2 is a schematic diagram of a light emitting diode (LED) backlight driving circuit of the present disclosure.
Figure 3:
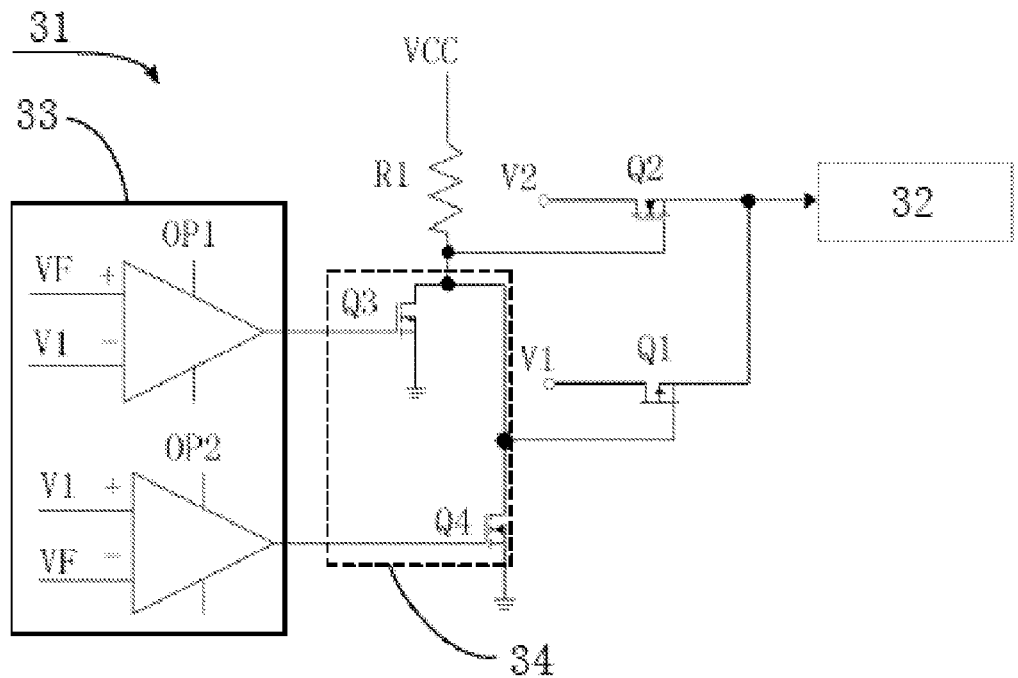
FIG. 3 is a schematic diagram of a switching unit of a first example of the present disclosure.

As shown in FIG. 1 to FIG. 3, in a first example, the switching unit 31 comprises a first controllable switch Q1, a second controllable switch Q2, a comparing assembly 33, and a switching assembly 34 coupled to the comparing assembly 33.

The first comparison voltage V1 is sent to the control unit 32 by the first controllable switch Q1, the second comparison voltage V2 is sent to the control unit 32 by the second controllable switch Q2.

The comparing assembly 33 comprises a first comparator OP1 and a second comparator OP2, a reference voltage VF is sent to a non-inverting input end of the first comparator OP1 and an inverting input end of the second comparator OP2, and the first comparison voltage V1 is sent to an inverting input end of the first comparator OP1 and a non-inverting input end of the second comparator OP2.

The switching assembly 34 comprises a third controllable switch Q3 and a fourth controllable switch Q4, a reference voltage with a high level (logic 1) VCC is sent to one ends of the third controllable switch Q3 and the fourth controllable switch Q4, and opposite ends of the third controllable switch Q3 and the fourth controllable switch Q4 are coupled to ground terminals.

The first comparator OP1 controls the third controllable switch Q3 to turn on/off, and the second comparator OP2 controls the fourth controllable switch Q4 to turn on/off.

The switching unit 31 further comprises a first resistor R1, the reference voltage with the high level VCC is sent to the third controllable switch Q3 and the fourth controllable switch Q4 via the first resistor R1. Control ends of the first controllable switch Q1 and the second controllable switch Q2 are coupled to the one ends of the third controllable switch Q3 and the fourth controllable switch Q4, and the one ends of the third controllable switch Q3 and the fourth controllable switch Q4 are connected with the first resistor R1. The first controllable switch Q1 is turned on at a low level (logic 0), and the second controllable switch Q2 is turned on at the high level (logic 1).

The power-voltage collecting module 21 comprises a second resistor R2, a third resistor R3, and a fourth resistor R4 that are connected in series between an output end of the power module and the ground terminal, where a voltage of the fourth resistor R4 is regarded as the second comparison V2 and sent to the switching unit 31.

The light-bar-voltage collecting module 41 comprises a fifth resistor R5 connected in series between an output end of the LED light bars and the ground terminal, and a voltage of the fifth resistor R5 is regarded as the first comparison V1 and is sent to the switching unit 31.

The first example provides an LED backlight driving circuit using the first controllable switch Q1 and the second controllable switch Q2 to control the first comparison voltage V1 and the second comparison V2, where logical operation of the first controllable switch Q1 is opposite to logical operation of the second controllable switch Q2. The LED backlight driving circuit is simple and avoids simultaneous feedback of the first comparison voltage V1 and the second comparison V2, thereby improving the LED backlight driving circuit reliability and capacity of stabilizing voltage. It should be considered that a capacitor may be connected with output ends of the first controllable switch Q1 and the second controllable switch Q2 in parallel.

One of two comparators is used to determine whether the first comparison voltage V1 is greater than the reference voltage VF or not, the other comparator is used to determine whether the first comparison voltage V1 is lower than the reference voltage VF or not. As long as the first comparison voltage V1 deviates from the reference voltage VF and the deviation value exceeds the preset deviation range of the voltage, the comparator is driven to turn on the third controllable switch Q3 and the fourth controllable switch Q4. Thus voltages of the control ends of the first controllable switch Q1 and the second controllable switch Q2 can increase or reduce, which drives the first controllable switch Q1 to turn on and the second controllable switch Q2 to turn off, then the switching unit outputs the first comparison voltage V1 to the control unit. Additionally, the controllable switch turns on, which requires a corresponding driving voltage, and the comparator may correspondingly amplify the driving voltage, so when the absolute value of the reference voltage VF subtracted from the first comparison voltage V1 exceeds the present deviation range, the driving voltage can drive the third controllable switch Q3 or the fourth controllable switch Q4 to turn on after the driving voltage is amplified by the comparator. Thus, the ordinary technical personnel of the technical field of the present disclosure may adjust the deviation range of the voltage by selecting different type comparators or the controllable switches driven by different driving voltages.

Levels of the control ends of the first controllable switch Q1 and the second controllable switch Q2 can be reduced by turning on any one of the third controllable switch Q3 and the fourth controllable switch Q4, where the first controllable switch Q1 turns on, and the switching unit outputs the first comparison voltage V1 to the control unit. The first resistor R1 may limit current flowing through the third controllable switch Q3 and the fourth controllable switch Q4, which avoids the third controllable switch Q3 and the fourth controllable switch Q4 from damage because of a high current, thereby improving reliability of the circuit.

The circuit of the power-voltage collecting module 21 and the light-bar-voltage collecting module 41 uses a resistor divider way, which simples the circuit and reduces product costs.

EXAMPLE 2

Figure 4:
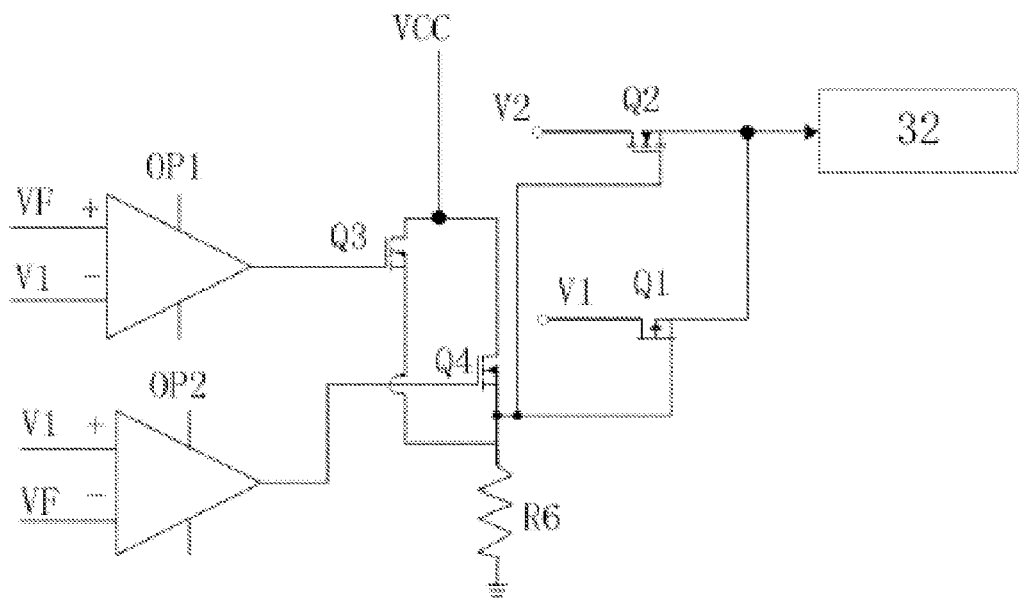
FIG. 4 is a schematic diagram of a switching unit of a second example of the present disclosure.

As shown in FIG. 1, FIG. 2, and FIG. 4, a second example provides a method for outputting the first comparison voltage V1 by turning on the first controllable switch Q1 at the high level. The switching unit comprises a sixth resistor R6, the third controllable switch Q3 and the fourth controllable switch Q4 are coupled to the ground terminal via the sixth resistor R6, the control ends of the first controllable switch Q1 and the second controllable switch Q2 are coupled to one ends of the third controllable switch Q3 and the fourth controllable switch Q4, where the one ends of the third controllable switch Q3 and the fourth controllable switch Q4 is connected with the sixth resistor R6. The first controllable switch Q1 turns on at the high level, and the second controllabe switch Q2 turns on at a low level.

Levels of the control ends of the first controllable switch Q1 and the second controllable switch Q2 can be improved by turning on any one of the third controllable switch Q3 and the fourth controllable switch Q4, where the first controllable switch Q1 turns on and the second controllable switch Q2 turns off, then the switching unit outputs the first comparison voltage V1 to the control unit. The sixth resistor R6 may divide the voltage of the circuit, thus a high level signal is outputted to drive the first controllable switch Q1 and the second controllable switch Q2 to turn on. Additionally, the sixth resistor R6 may also limit current flowing through the third controllable switch Q3 and the fourth controllable switch Q4, which avoids the third controllable switch Q3 and the fourth controllable switch Q4 from damage because of a high current, thereby improving reliability of the circuit.

EXAMPLE 3

Figure 5:
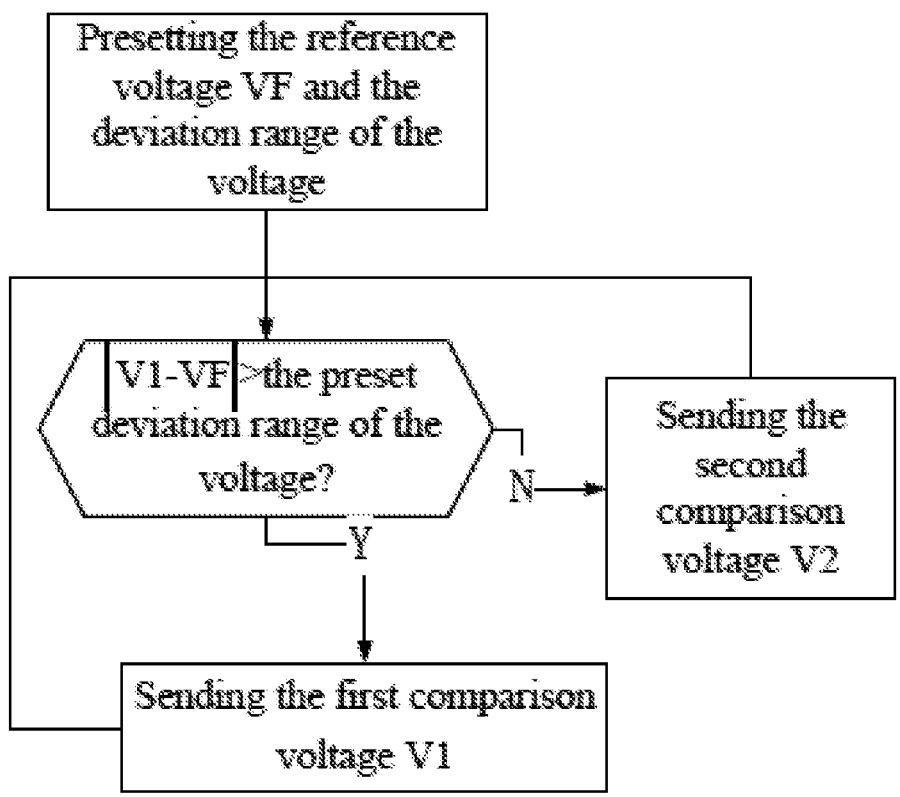
FIG. 5 is a flowchart of a method for driving a light emitting diode (LED) backlight driving circuit of a third example of the present disclosure.

As shown in FIG. 5, a third example provide a method for driving the light emitting diode (LED) backlight driving circuit, the LED backlight driving circuit comprises the power module and the LED light bar coupled to the power module the method comprises:

A: presetting the reference voltage VF, receiving the output voltage of the LED light bar as the first comparison voltage V1, and receiving the output voltage of the power module as the second comparison voltage V2;

B: comparing the first comparison voltage V1 with the reference voltage VF, when the absolute value of the reference voltage VF subtracted from the first comparison voltage V1 deviates from a preset deviation range of the voltage, executing a step C; when the absolute value of the reference voltage VF subtracted from the first comparison voltage V1 is within the preset deviation range of the voltage, executing a step D;

C: sending the first comparison voltage V1 to the power module, and adjusting the output voltage of the power module, returning the step B; and D: sending the second comparison voltage V2 to the power module, and stabilizing the output voltage of the power module, then returning the step B.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

We claim:

1. A light emitting diode (LED) backlight driving circuit, comprising:
   a power module;
   a constant current driving module;
   an LED light bar coupled to the power module;
   a power-voltage collecting module coupled to an output end of the power module; and
   a light-bar-voltage collecting module coupled to an output end of the LED light bar;
   wherein the light-bar-voltage collecting module outputs a first comparison voltage, and the power-voltage collecting module outputs a second comparison voltage;
   the constant current driving module comprises a switching unit and a control unit coupled to the switching unit; the control unit adjusts an output voltage of the power module, the first comparison voltage and the second comparison voltage are sent to the switching unit, and a preset reference voltage is sent to the switching unit;
   and the switching unit comprises a comparing assembly, the comparing assembly compares the first comparison voltage with the preset reference voltage and an absolute value of a difference between the preset reference voltage and the first comparison voltage exceeds a preset range of a voltage, the switching unit outputs the first comparison voltage to the control unit; when the absolute value of the difference between the preset reference voltage and the first comparison voltage is within the preset range of the voltage, the switching unit outputs the second comparison voltage to the control unit.

2. The LED backlight driving circuit of claim 1, wherein the switching unit comprises a first controllable switch, a second controllable switch, and a switching assembly coupled to the comparing assembly;
   the first comparison voltage is sent to the control unit by the first controllable switch, the second comparison voltage is sent to the control unit by the second controllable switch, and logical operation of the first controllable switch is opposite to logical operation of the second controllable switch;
   a reference voltage with a high level is sent to a first end of the switching assembly, and a second end of the switching assembly is coupled to a ground terminal; a control end of the first controllable switch and a control end of the second controllable switch are coupled to a same end of the switching assembly;
   when the absolute value of the difference between the preset reference voltage and the first comparison voltage exceeds a preset range of the voltage, the comparing assembly drives the switching assembly to turn on, and drives the first controllable switch to turn on and the second controllable switch to turn off.

3. The LED backlight driving circuit of claim 2, wherein the power-voltage collecting module comprises a first resistor, a second resistor, and a third resistor that are connected in series between the output end of the power module and the ground terminal; a voltage of the third resistor is regarded as the second comparison voltage and is sent to the switching unit;
   the light-bar-voltage collecting module comprises a first resistor, and the first resistor of the light-bar-voltage collecting module is connected in series between the output end of the LED light bar and the ground terminal; a voltage of the first resistor of the light-bar-voltage collecting module is regarded as the first comparison voltage and is sent to the switching unit.

4. The LED backlight driving circuit of claim 2, wherein the comparing assembly comprises a first comparator and a second comparator; the reference voltage is sent to a non-Inverting input end of the first comparator and an inverting input end of the second comparator, and the first comparison voltage is sent to an inverting input end of the first comparator and a non-inverting input end of the second comparator;

the switching assembly comprises a third controllable switch and a fourth controllable switch, the reference voltage with the high level is sent to first ends of the third controllable switch and the fourth controllable switch, and second ends of the third controllable switch and the fourth controllable switch are coupled to the ground terminal;

the first comparator controls the third controllable switch to turn on/off, and the second comparator controls the fourth controllable switch to turn on/off.

5. The LED backlight driving circuit of claim 4, wherein the power-voltage collecting module comprises a first resistor, a second resistor, and a third resistor that are connected in series between the output end of the power module and the ground terminal; a voltage of the third resistor is regarded as the second comparison voltage and is sent to the switching unit;

the light-bar-voltage collecting module comprises a first resistor, and the first resistor of the light-bar-voltage collecting module is connected in series between the output end of the LED light bar and the ground terminals; a voltage of the first resistor of the light-bar-voltage collecting module is regarded as the first comparison voltage and is sent to the switching unit.

6. The LED backlight driving circuit of claim 4, wherein the switching unit further comprises a first resistor, the reference voltage with the high level is sent to the third controllable switch and the fourth controllable switch via the first resistor; control ends of the first controllable switch and the second controllable switch are coupled to first ends of the third controllable switch and the fourth controllable switch;

the first controllable switch turns on at a low level, and the second controllable switch turns on at the high level.

7. The LED backlight driving circuit of claim 4, wherein the switching unit further comprises a sixth resistor, the third controllable switch and the fourth controllable switch are coupled to the ground terminal via the sixth resistor; control ends of the first controllable switch and the second controllable switch are coupled to the opposite ends of the third controllable switch and the fourth controllable switch, and the second ends of the third controllable switch and the fourth controllable switch is connected to the sixth resistor;

the first controllable switch turns on at the high level, and the second controllable switch turns on at a low level.

8. The LED backlight driving circuit of claim 1, wherein the power-voltage collecting module comprises a first resistor, a second resistor, and a third resistor that are connected in series between the output end of the power module and a ground terminal; a voltage of the third resistor is regarded as the second comparison voltage and is sent to the switching unit.

9. The LED backlight driving circuit of claim 1, wherein the light-bar-voltage collecting module comprises a first resistor, the first resistor is connected in series between the output end of the LED light bar and the ground terminal; a voltage of the first resistor is regarded as the first comparison voltage and is sent to the switching unit.

10. The LED backlight driving circuit of claim 1, wherein the switching unit comprises a first controllable switch, a second controllable switch, a comparing assembly, and a switching assembly coupled to the comparing assembly;

the first comparison voltage is sent to the control unit by the first controllable switch, the second comparison voltage is sent to the control unit by the second controllable switch;

the comparing assembly comprises a first comparator and a second comparator; the reference voltage is sent to a non-inverting input end of the first comparator and an inverting input end of the second comparator, and the first comparison voltage is sent to an inverting input end of the first comparator and a non-inverting input end of the second comparator;

the switching assembly comprises a third controllable switch and a fourth controllable switch, the reference voltage with the high level is sent to first terminals of the third controllable switch and the fourth controllable switch, and second terminals of the third controllable switch and the fourth controllable switch are coupled to the ground terminal;

the first comparator controls the third controllable to turn on/off, and the second comparator controls the fourth controllable to turn on/off;

the switching unit farther comprises a first resistor, the reference voltage with the high level is sent to the third controllable switch and the fourth controllable switch via the first resistor; control ends of the first controllable switch and the second controllable switch are coupled to first ends of the third controllable switch and the fourth controllable switch;

the first controllable switch turns on at a low level, and the second controllable switch turns on at the high level;

the power-voltage collecting module comprises a second resistor, a third resistor, and a fourth resistor that are connected in series between the output end of the power module and the ground terminal; a voltage of the fourth resistor is regarded as the second comparison voltage and is sent to the switching unit;

the light-bar-voltage collecting module comprises a fifth resistor, and the fifth resistor is connected in series between the output end of the LED light bar and the ground terminal; a voltage of the fifth resistor is regarded as the first comparison voltage and is sent to the switching unit.

11. A liquid crystal display (LCD) device, comprising:
a light emitting diode (LED) backlight driving circuit;
wherein the LED backlight driving circuit comprises a power module, a constant current driving module, an LED light bar coupled to the power module, a power-voltage collecting module coupled to an output end of the power module, and a light-bar-voltage collecting module coupled to an output end of the LED light bar; the light-bar-voltage collecting module outputs a first comparison voltage, and the power-voltage collecting module outputs a second comparison voltage;

the constant current driving module comprises a switching unit and a control unit coupled to the switching unit; the control unit adjusts an output voltage of the power module, the first comparison voltage and the second comparison voltage are sent to the switching unit, and a preset reference voltage is sent to the switching unit;

and the switching unit comprises a comparing assembly, the comparing assembly compares the first comparison voltage with the preset reference voltage and an absolute value of a difference between the preset reference voltage and the first comparison voltage exceeds a preset range of a voltage, the switching unit outputs the first comparison voltage to the control unit; when the absolute value of the difference between the preset reference voltage and the first comparison voltage is within the preset range of the voltage, the switching unit outputs the second comparison voltage to the control unit.

12. The LCD device of claim 11, wherein the switching unit comprises a first controllable switch, a second controllable switch, and a switching assembly coupled to the comparing assembly;

the first comparison voltage is sent to the control unit by the first controllable switch, the second comparison voltage is sent to the control unit by the second controllable switch, and logical operation of the first controllable switch is opposite to logical operation of the second controllable switch;

a reference voltage with a high level is sent to a first end of the switching assembly, and a second end of the switching assembly is coupled to a ground terminal; a control end of the first controllable switch and a control end of the second controllable switch are coupled to the same end of the switching assembly;

when the absolute value of the difference between the preset reference voltage and the first comparison voltage exceeds a preset range of the voltage, the comparing assembly drives the switching assembly to turn on, and drives the first controllable switch to turn on and the second controllable switch to turn off.

13. The LCD device of claim 12, wherein the comparing assembly comprises a first comparator and a second comparator; the reference voltage is sent to a non-inverting input end of the first comparator and an inverting input end of the second comparator, and the first comparison voltage is sent to an inverting input end of the first comparator and a non-inverting input end of the second comparator;

the switching assembly comprises a third controllable switch and a fourth controllable switch, the reference voltage with the high level is sent to first ends of the third controllable switch and the fourth controllable switch, and second ends of the third controllable switch and the fourth controllable switch are coupled to the ground end;

the first comparator controls the third controllable switch to turn/off, and the second comparator controls the fourth controllable switch to turn on/off.

14. The LCD device of claim 13, wherein the switching unit further comprises a first resistor, the reference voltage with the high level is sent to the third controllable switch and the fourth controllable switch via the first resistor; control ends of the first controllable switch and the second controllable switch are coupled to first ends of the third controllable switch and the fourth controllable switch;

the first controllable switch turns on at a low level, and the second controllable switch turns on at the high level.

15. The LCD device of claim 13, wherein the switching unit further comprises a sixth resistor, the third controllable switch and the fourth controllable switch are coupled to the ground terminal via the sixth resistor; control ends of the first controllable switch and the second controllable switch are coupled to second ends of the third controllable switch and the fourth controllable switch, and the second ends of the third controllable switch and the fourth controllable switch is connected to the sixth resistor;

the first controllable switch turns on at the high level, and the second controllable switch turns on at a low level.

16. The LCD device of claim 11, wherein the power-voltage collecting module comprises a first resistor, a second resistor, and a third resistor that are connected in series between the output end of the power module and the ground terminal; a voltage of the fourth resistor is regarded as second comparison voltage and is sent to the switching unit.

17. The LCD device of claim 11, wherein the light-bar-voltage collecting module comprises a first resistor, the first resistor is connected in series between the output end of the LED light bar and the ground terminal; a voltage of the first resistor is regarded as the first comparison voltage and is sent to the switching unit.

18. The LCD device of claim 11, wherein the switching unit comprises a first controllable switch, a second controllable switch, a comparing assembly, and a switching assembly coupled to the comparing assembly;

the first comparison voltage is sent to the control unit by the first controllable switch, the second comparison voltage is sent to the control unit by the second controllable switch;

the comparing assembly comprises a first comparator and a second comparator;

the reference voltage is sent to a non-inverting input end of the first comparator and an inverting input end of the second comparator, and the first comparison voltage is sent to an inverting input end of the first comparator and a non-inverting input end of the second comparator;

the switching assembly comprises a third controllable switch and a fourth controllable switch, the reference voltage with the high level is sent to first terminals of the third controllable switch and the fourth controllable switch, and second terminals of the third controllable switch and the fourth controllable switch are coupled to the ground terminal;

the first comparator controls the third controllable to turn on/off, and the second comparator controls the fourth controllable to turn on/off;

the switching unit further comprises a first resistor, the reference voltage with the high level is sent to the third controllable switch and the fourth controllable switch via the first resistor; control ends of the first controllable switch and the second controllable switch are coupled to first ends of the third controllable switch and the fourth controllable switch;

the first controllable switch turns on at a low level, and the second controllable switch turns on at the high level;

the power-voltage collecting module comprises a second resistor, a third resistor, and a fourth resistor that are connected in series between the output end of the power module and the ground terminal; a voltage of the fourth resistor is regarded as the second comparison voltage and is sent to the switching unit;

the light-bar-voltage collecting module comprises a fifth resistor, and the fifth resistor is connected in series between the output end of the LED light bar and the ground terminal; a voltage of the fifth resistor is regarded as the first comparison voltage and is sent to the switching unit.

19. A light emitting diode (LED) backlight driving circuit, comprising:
a power module;
a constant current driving module;
an LED light bar coupled to the power module;
a power-voltage collecting module coupled to an output end of the power module; and
a light-bar-voltage collecting module coupled to an output end of the LED light bar;
wherein the light-bar-voltage collecting module outputs a first comparison voltage, and the power-voltage collecting module outputs a second comparison voltage;
the constant current driving module comprises a switching unit and a control unit coupled to the switching unit; the control unit adjusts an output voltage of the power module, the first comparison voltage and the second comparison voltage are sent to the switching unit, and a preset reference voltage is sent to the switching unit;

and the switching unit comprises a comparing assembly, the comparing assembly compares the first comparison voltage with the preset reference voltage and an absolute value of a difference between the preset reference voltage and the first comparison voltage exceeds a preset range of a voltage, the switching unit outputs the first comparison voltage to the control unit; when the absolute value of the difference between the preset reference voltage and the first comparison voltage is within the preset range of the voltage, the switching unit outputs the second comparison voltage to the control unit;

wherein the switching unit further comprises a first controllable switch, a second controllable switch, and a switching assembly coupled to the comparing assembly;

the first comparison voltage is sent to the control unit by the first controllable switch, the second comparison voltage is sent to the control unit by the second controllable switch, and logical operation of the first controllable switch is opposite to logical operation of the second controllable switch;

the preset reference voltage with a high level is sent to a first end of the switching assembly, and a second end of the switching assembly is coupled to a ground terminal; a control end of the first controllable switch and a control end of the second controllable switch are coupled to a same end of the switching assembly, when the absolute value of the difference between the preset reference voltage and the first comparison voltage exceeds the preset range of the voltage, the comparing assembly drives the switching assembly to turn on, and drives the first controllable switch to turn on and the second controllable switch to turn off.

* * * * *